Oct. 12, 1926.
J. ALEXANDER
1,603,101
MILK BOTTLE CLOSURE
Filed Oct. 27, 1924
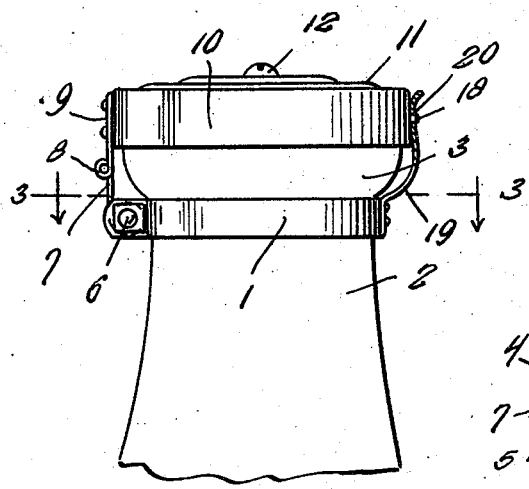
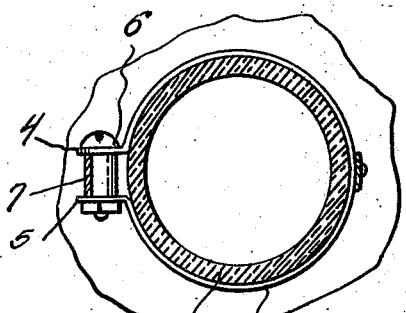
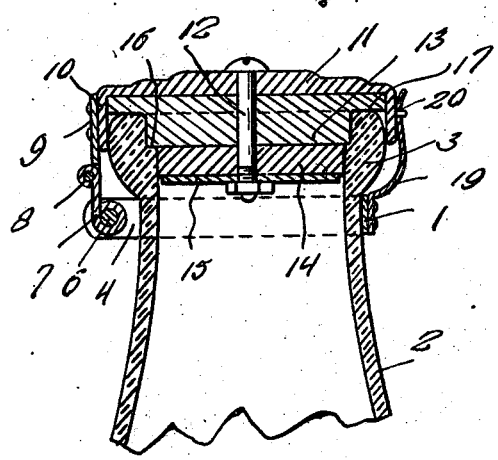
John Alexander,
Inventor
By Clarence A. O'Brien
Attorney Patented Oct. 12, 1926.

1,603,101

UNITED STATES PATENT OFFICE.

JOHN ALEXANDER, OF NEW ORLEANS, LOUISIANA.

MILK-BOTTLE CLOSURE.

Application filed October 27, 1924. Serial No. 746,118.

This invention relates to improvements in closures for milk bottles and has for its principal object to provide a simple and efficient means for normally closing a milk bottle in order to protect the contents thereof against any foreign substance, the closure being of such construction as to permit the same to be readily swung out of engagement with the bottle whereby the contents thereof may be poured therefrom.

A further object of the invention is to provide a milk bottle closure of the above mentioned character, wherein the same is so associated with the neck of the milk bottle as to prevent the same from becoming misplaced when the contents of the bottle are being poured out.

A further object of the invention is to provide a milk bottle closure of the above mentioned character, wherein means is provided for locking the closure against accidental disengagement from the top of the milk bottle when the latter is not in use.

A still further object is to provide a milk bottle closure of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the milk bottle closure embodying my invention showing the same in position on a milk bottle.

Figure 2 is a sectional view showing the manner in which the stopper associated with the cap or cover fits in the upper portion of the neck of the milk bottle, and Figure 3 is a sectional view taken approximately on line 3—3 of Figure 1 looking in the direction of the arrows.

In the drawing, wherein for the purpose of illustration is shown the preferred embodiment of my invention, the numeral 1 designates a metallic band or ring which is adapted to encircle the neck 2 of the milk bottle directly below the usual bead 3 formed on the upper portion of the neck. The free ends of the band 1 are disposed outwardly in parallel spaced relation with respect to each other as illustrated at 4 and 5 respectively in the drawing with reference more particularly to Figure 3. A pivot bolt or screw 6 is adapted to extend through suitable registering openings provided in the outwardly disposed ends 4 and 5 of the band 1.

A tongue 7 formed of a strip of metal is bent around the pivot bolt 6 so as to be disposed between the parallel spaced free ends 4 and 5 of the band 1 whereby the tongue is adapted for swinging movement at its lower end on the bolt. The tongue 7 extends upwardly and is hingedly connected at its upper end as illustrated at 8 to the lower end of a depending strip 9 secured to the annular flange 10 of the closure cap 11 which fits over the bead 3 of the milk bottle in the manner more clearly illustrated in Figures 1 and 2.

The cap 11 is preferably formed of sheet metal and secured to the under side thereof by means of the fastening screw or bolt 12 are the rubber or cork stoppers 13 and 14 respectively. A washer 15 is arranged on the bottom of the lowermost stopper 14 as is shown in Figure 2. The lowermost stopper 14 is of a diameter less than the diameter of the uppermost rubber stopper and is disposed within the upper portion of the neck 2 of the bottle while the bottom edge of the uppermost rubber stopper 13 rests on the annular ledge or shoulder 16 formed in the bead 3 of the milk bottle for receiving the usual stopper disc whereby the contents of the milk bottle are prevented from being spilled. An annular flange 17 is provided at the upper portion of the stopper 13 and the same rests on the upper edge of the bead 3 thereby insuring a tight fit of the stoppers in the upper portion of the neck of the milk bottle for sealing the contents and preventing any foreign substance from gaining access to the interior of the milk bottle.

For the purpose of retaining the cap 11 and the stopper in position, a pin or projection 18 extends laterally from the annular flange 10 on the cap 11 at a point diametrically opposite the hinged connection between the cap and the tongue. A spring 19 is secured at its lower end to the band 1 and the upper end thereof is provided with a suitable opening 20 through which the pin or projection 18 is adapted to extend whereby the cap and the stoppers are held in engagement with the top of the milk bottle and prevent the accidental displacement thereof.

By moving the upper end of the spring 19 out of engagement with the pin 18, the cap 11 and the stoppers carried thereby may be swung upwardly out of engagement with the neck of the bottle so that the contents thereof may be easily poured. Furthermore, the closure will not become misplaced when the contents of the bottle is being poured out due to the fact that the tongue 7 supports the cap.

The construction of my improved bottle closure enables the same to be readily and easily attached in position on the neck of the milk bottle and will at all times be positive and efficient in carrying out the purposes for which the same is designated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A closure for milk bottles wherein the latter is provided with an inner annular shoulder at a point adjacent the open upper end thereof, said closure comprising a cap adapted to fit over the open top of the bottle, a pair of stoppers, a washer disposed adjacent the bottom of the lowermost stopper, a bolt extending centrally through the washer, stoppers, and the top of the cap for securing the parts together, the lowermost stopper fitting snugly in the neck of the bottle at a point below the shoulder, the uppermost stopper being of a diameter greater than the diameter of the first mentioned stopper and adapted to fit snugly in the neck of the bottle at a point above the shoulder, the outer portion of the bottom of the uppermost stopper being adapted to rest on the aforementioned shoulder, an annular flange formed on the upper portion of the uppermost stopper and resting on the upper edge of the top of the bottle, the depending flanged portion of the cap extending over the outer edge of the annular flange of the uppermost stopper and the adjacent portion of the top of the bottle, and means for securing the cap on the bottle.

In testimony whereof I affix my signature.

JOHN ALEXANDER.